United States Patent [19]

Tokuyama

[11] Patent Number: 4,521,815
[45] Date of Patent: Jun. 4, 1985

[54] REPRODUCING APPARATUS CAPABLE OF PERFORMING HIGH-SPEED REPRODUCTION OF A VIDEO SIGNAL

[75] Inventor: Yoshio Tokuyama, Yokohama, Japan

[73] Assignee: Victor Company of Japan, Limited, Japan

[21] Appl. No.: 396,293

[22] Filed: Jul. 8, 1982

[30] Foreign Application Priority Data

Jul. 10, 1981 [JP] Japan .............................. 56-102473[U]
Jul. 10, 1981 [JP] Japan .............................. 56-102474[U]

[51] Int. Cl.$^3$ .............................................. H04N 5/783
[52] U.S. Cl. .................................. 360/10.2; 360/10.3; 360/70; 360/73; 360/75
[58] Field of Search .................... 360/10.2, 10.3, 70, 360/73, 75; 318/314, 318; 242/206

[56] References Cited

U.S. PATENT DOCUMENTS

| | | | |
|---|---|---|---|
| 3,934,269 | 1/1976 | Fujita | 360/70 |
| 3,959,818 | 5/1976 | Iketaki | 360/70 |
| 4,001,886 | 1/1977 | Bruinink | 360/75 |
| 4,212,039 | 7/1980 | Koda | 360/73 |
| 4,249,220 | 2/1981 | Yasutake | 360/73 |
| 4,318,140 | 3/1982 | Shigeta | 360/73 |
| 4,328,518 | 5/1982 | Kawata | 360/64 |
| 4,426,668 | 1/1984 | Itoh | 360/73 |

FOREIGN PATENT DOCUMENTS 1944041 12/1971 Fed. Rep. of Germany ..... 360/10.3

*Primary Examiner*—Alan Faber
*Attorney, Agent, or Firm*—Andrus, Sceales, Starke & Sawall

[57] ABSTRACT

A video signal reproducing apparatus capable of performing high-speed reproduction comprises a reproducing circuit having at least one rotary video head for scanning over a tape recorded with a video signal on tracks formed obliquely with respect to the longitudinal direction of the tape and a control pulse recorded on a track formed along the longitudinal direction of the tape, for reproducing the video signal from the oblique tracks, a tape driving circuit for causing the tape travel at a speed higher than a tape speed upon normal reproduction during high-speed reproduction, a motor controlled of its rotation, a motor speed detecting circuit for detecting the rotational speed of the motor and producing a rotation detection signal having a repetition frequency in accordance with the detected rotational speed, an input switching circuit for supplying a signal reproduced from the tape to a frequency-voltage converter upon high-speed reproduction, where the frequency-voltage converter is supplied with the rotation detection signal from the motor speed detecting circuit upon normal reproduction, and a servo circuit for controlling the tape driving circuit and/or the motor by using an output voltage of the frequency-voltage converter as a speed control signal.

5 Claims, 5 Drawing Figures

REPRODUCING APPARATUS CAPABLE OF PERFORMING HIGH-SPEED REPRODUCTION OF A VIDEO SIGNAL

BACKGROUND OF THE INVENTION

The present invention generally relates to reproducing apparatuses capable of performing high-speed reproduction of a video signal recorded on tracks formed obliquely with respect to the longitudinal direction of a magnetic tape, and more particularly to a reproducing apparatus capable of performing high-speed reproduction of a video signal by use of a simple circuit construction requiring few adjustments, by commonly using a frequency-voltage converter within a servo circuit which controls the speed of a motor, during a high-speed reproduction, normal reproduction, and the like.

A helical scan type recording and reproducing apparatus has been known conventionally, for recording and reproducing a video signal on and from a magnetic tape. In such a recording and reproducing apparatus, the video signal is recorded along tracks formed obliquely with respect to the longitudinal direction of the magnetic tape by rotary video heads, upon recording. Moreover, a control pulse having a predetermined period is recorded on a control track formed along the longitudinal direction of the magnetic tape by a stationary control head. Among this type of recording and reproducing apparatuses, there are apparatuses capable of obtaining a high-speed reproduction picture in which the movement in the picture is considerably quick compared to the movement in a normal reproduction picture. The high-speed reproduction is performed by reproducing the video signal by the rotary video heads in a state where the magnetic tape is caused to travel in the same direction as upon recording or in the opposite direction at a speed in the order of ten times the tape speed upon recording or normal reproduction. During this high-speed reproduction, a desired recording position of the video signal recorded on the magnetic tape is searched and detected at a high speed, by monitoring the high-speed reproduction picture.

During the above high-speed reproduction, the pressing contact between a capstan and a pinch roller is released, for example, to cause the magnetic tape to travel at a high speed by the rotational force of a reel motor. Here, the magnetic tape must always travel at a constant speed, regardless of the length or amount of magnetic tape wound around the reel. Thus, during the high-speed reproduction, the control pulse reproduced from the control track is supplied to a frequency-voltage converter wherein the control pulse is converted into a voltage in accordance with the tape traveling speed. This voltage from the frequency-voltage converter is applied to the reel motor, to control the rotational speed of the reel motor so that the control pulse is reproduced with a predetermined period.

If a head servo circuit for controlling the rotational speed of the rotary video heads to a constant speed is operated in the same manner as upon normal reproduction, the rotational speed of a drum motor which rotates a rotary body mounted with the rotary video heads becomes equal to the rotational speed upon normal reproduction. On the other hand, because the tape traveling speed upon high-speed reproduction is in the order of ten times the tape traveling speed upon normal reproduction, the relative linear speed between the tape and the heads becomes different from that upon normal reproduction. Accordingly, the reproduced video signal frequency and the reproduced horizontal scanning frequency deviate from predetermined values, and horizontal synchronism cannot be obtained in the television receiver.

Therefore, in the conventional apparatus, a phase control loop within the above head servo circuit was disconnected upon high-speed reproduction, and simultaneously, the reproduced horizontal synchronizing signal was supplied to a frequency-voltage converter. Hence, the reproduced horizontal synchronizing signal was converted into a voltage in accordance with the reproduced horizontal synchronizing signal frequency at the frequency-voltage converter, and an output voltage of this frequency-voltage converter was applied to the above drum motor. Accordingly, the rotational speed of the drum motor was controlled so that the reproduced horizontal synchronizing signal frequency became a predetermined value (for example, 15.734 kHz upon recording and reproduction of an NTSC system color video signal). As a result, the rotational speed of the drum motor became faster than the rotational speed upon normal reproduction, during a high-speed reproduction in which the tape is caused to travel in the same direction as upon recording. On the other hand, the rotational speed of the drum motor became slower than the rotational speed upon normal reproduction, during a high-speed reproduction in which the tape is caused to travel in a direction opposite to that upon recording.

However, the above frequency-voltage converter supplied with the reproduced control pulse and the frequency-voltage converter supplied with the reproduced horizontal synchronizing signal, respectively are used only during the high-speed reproduction. Thus, the circuit construction became complex and uneconomical. Further, because both the frequency-voltage converters must be adjusted, there was a disadvantage in that the adjustments were troublesome to perform and time consuming.

SUMMARY OF THE INVENTION

Accordingly, it is a general object of the present invention to provide a novel and useful reproducing apparatus capable of performing high-speed reproduction of a video signal, in which the above described disadvantages have been overcome.

Another and more specific object of the present invention is to provide a reproducing apparatus capable of performing high-speed reproduction of a video signal, in which a frequency-voltage converter is supplied with a rotational speed detection signal of a motor upon normal reproduction, a switch is provided for supplying a signal reproduced from a magnetic tape to the frequency-voltage converter upon high-speed reproduction, and an output voltage of the frequency-voltage converter is supplied to a servo circuit for the motor as a speed control signal, to control the rotational speed of the motor. According to the apparatus of the present invention, a frequency-voltage converter which is provided within the servo circuit for the motor and used upon normal reproduction, can also be used upon high-speed reproduction. Hence, the number of frequency-voltage converters required can be reduced compared to the conventional apparatus. The circuit construction is thus simplified and the cost of the circuit is reduced. Furthermore, a total adjusting time required to adjust the frequency-voltage converters is reduced.

Still another object of the present invention is to provide a reproducing apparatus which performs the high-speed reproduction by frequency-dividing an input signal frequency to a frequency-voltage converter which supplies a speed control signal to a head servo circuit, so that the input signal frequency to the frequency-voltage converter becomes the same upon high-speed reproduction and normal reproduction. According to the apparatus of the present invention, it becomes unnecessary to adjust the above frequency-voltage converter so that the reproduced horizontal scanning frequency becomes a predetermined value upon high-speed reproduction.

Another object of the present invention is to provide a reproducing apparatus in which the construction of a frequency generator for detecting the rotational speed of a drum motor is the same regardless of the system of a video signal which is to be reproduced.

Other objects and further features of the present invention will be apparent from the following detailed description when read in conjunction with the accompanying drawings.

DETAILED DESCRIPTION

Figure 1:
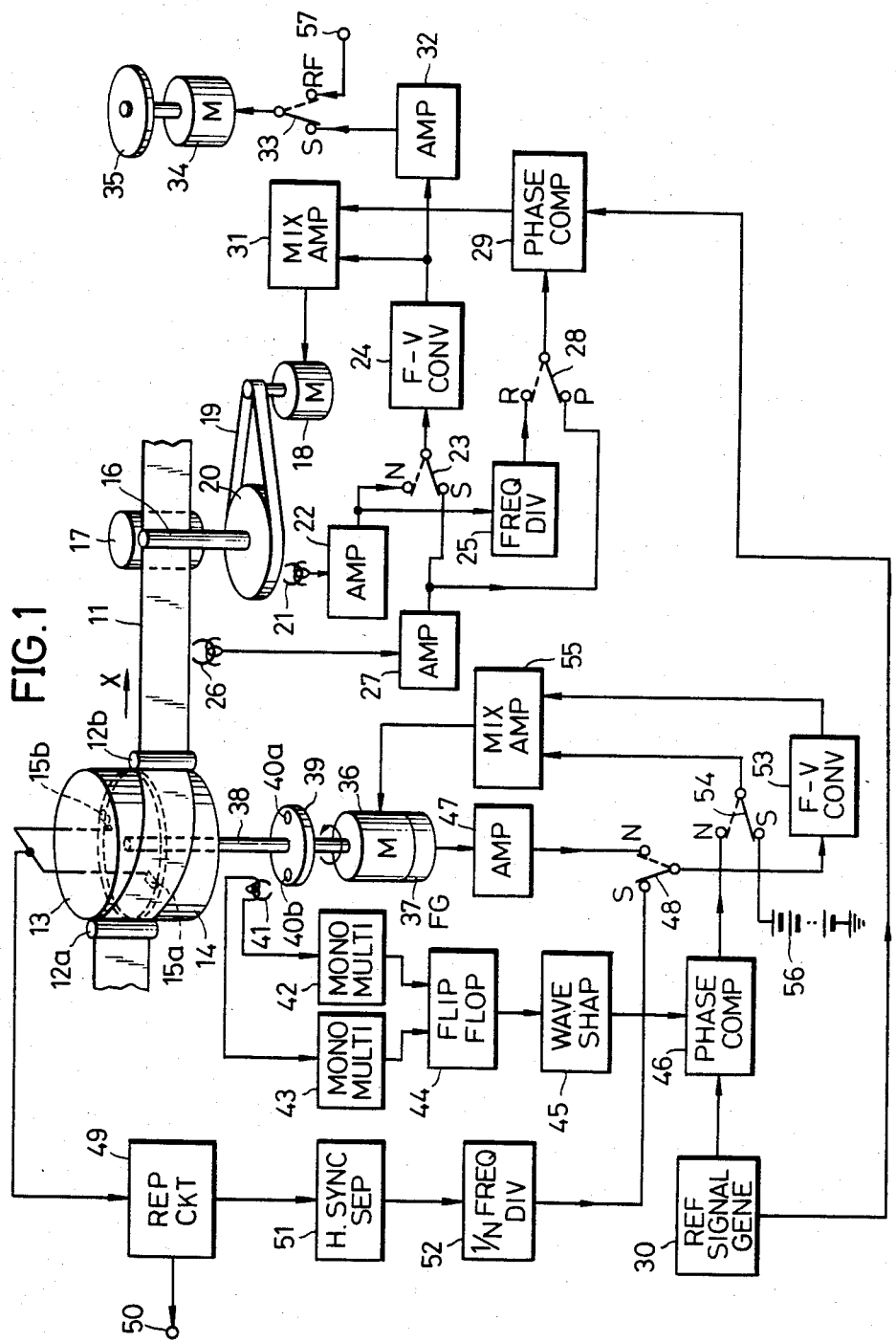
FIG. 1 is a systematic block diagram showing an embodiment of a reproducing apparatus capable of performing high-speed reproduction of a video signal according to the present invention.

In FIG. 1, a magnetic tape 11 is guided by guide poles 12a and 12b, and wrapped obliquely around peripheral surfaces of a rotary drum 13 and a stationary drum 14, throughout an angular range slightly over 180°. This magnetic tape 11 is pinched between a capstan 16 and a pinch roller 17, and caused to travel in the direction of an arrow X due to the rotation of the capstan 16. For example, a frequency-modulated video signal is recorded on tracks formed obliquely with respect to the longitudinal direction of the magnetic tape 11. In addition, a control pulse having a constant period is recorded on a control track formed at a predetermined position along the longitudinal direction of the magnetic tape 11. One field of video signal is recorded on each oblique track on the magnetic tape 11. Video heads 15a and 15b are mounted on the rotary drum 13 opposing each other along the diametral direction of the rotary drum 13. The video heads 15a and 15b alternately scan over the oblique tracks on the magnetic tape 11.

Switches 23, 33, 48, and 54 are respectively connected to a contact S upon high-speed reproduction, and the switches 23, 48, and 54 are connected to a contact N upon normal reproduction. A switch 28 is connected to a contact P upon normal reproduction and high-speed reproduction, and connected to a contact R upon recording. Further, the switch 33 is connected to a contact RF during a fast-forward and rewind modes when the magnetic tape 11 is caused to travel at a tape speed considerably higher than the tape speed upon high-speed reproduction, to selectively supply a signal from an input terminal 57 to a reel motor 34. On the other hand, during normal reproduction and recording, the switch 33 is neither connected to the contact S or the contact RF. During the fast-forward and the rewind modes, the above oblique tracks on the magnetic tape 11 are not reproduced, and the capstan 16 becomes separated from the pinch roller 17.

The rotation of a motor 18 is transmitted to a flywheel 20, by way of a belt 19. Thus, the capstan 16 coaxially provided at a center part of the flywheel 20, is accordingly rotated.

First, description will be given with respect to the operation of the apparatus upon normal reproduction. During normal reproduction, the motors 18, 34, and 36 are rotated at speeds identical to those upon recording. Every time a magnet (not shown), provided on the flywheel 20 which rotates unitarily with the motor 18 and the capstan 16, passes a position opposing a gap surface of a pickup head 21, the pickup head 21 produces a pulse. The repetition frequency of this pulse thus produced, shows a value in accordance with the rotation of the capstan 16. Hence, this pulse is supplied to a frequency-voltage converter 24 as a rotation detection signal of the capstan 16, through an amplifier 22 and the switch 23. On the other hand, the pulse from amplifier 22 is also supplied to a frequency divider 25.

The control pulse is reproduced from the control track on the magnetic tape 11 which is traveling in the direction of the arrow X, by a control head 26. The reproduced control pulse is supplied to a phase comparator 29, through an amplifier 27 and the switch 28. The phase comparator 29 compares the phases of the reproduced control pulse and a reference signal obtained from a reference signal generator 30.

The frequency-voltage converter 24 converts the above rotation detection signal into a voltage having a level in accordance with the repetition frequency of the rotation detection signal. This voltage from the frequency-voltage converter 24 is applied to the motor 18 through a mixing amplifier 31. A closed loop formed by the above pickup head 21, amplifier 22, switch 23, frequency-voltage converter 24, mixing amplifier 31, and motor 18, constitutes a speed control circuit within a capstan servo circuit. The motor 18 and the capstan 16 are rotated at constant speeds, by this speed control circuit.

On the other hand, a phase error voltage obtained from the phase comparator 29, is applied to the motor 18 through the mixing amplifier 31. The control head 26, amplifier 27, switch 28, phase comparator 29, and mixing amplifier 31 constitute a phase control circuit within the capstan servo circuit. The rotational phases of the motor 18 and the capstan 16 are respectively kept constant by this phase control circuit. Accordingly, the capstan 16 is rotated with the same constant speed and phase as upon recording, and the mangetic tape 11 is caused to travel in the direction of the arrow X at a constant tape speed.

Upon recording, the switch 28 is connected to the contact R, and the output signal of the frequency divider 25 is supplied to the phase comparator 29.

A rotary shaft 38 of the drum motor 36 passes through a center part of the stationary drum 14, and is coaxially fixed at a center part of the rotary drum 14. A disc 39 is fixed at a part of the rotary shaft 38, in a state where the rotary shaft 38 passes through a center part of the disc 39. When the drum motor 36 rotates, the rotary drum 13 and the disc 39 rotate unitarily. Magnets 40a and 40b are respectively provided on the disc 39, at mutually opposing positions along the diametral direction of the disc 39. The rotational phase of the drum motor 36, is detected by a drum pickup head 41 and the magnets 40a and 40b. Phase detection signals of mutually different polarities are alternately and respectively obtained from the drum pickup head 41, and supplied to monostable multivibrators 42 and 43.

Pulses obtained from the monostable multivibrators 42 and 43 are applied to a flip-flop 44, to alternately reverse the stable states of the flip-flop 44. Hence, a square wave having a frequency of 30 Hz, for example, is obtained from the flip-flop 44. This square wave assumes high level during a track scanning period of one of the video heads 15a and 15b, and assumes a low level during a track scanning period of the other video head. The above square wave is subjected to wave-shaping at a waveform shaping circuit 45. An output of the waveform shaping circuit 45 is applied to a phase comparator 46 as a comparison signal, and compared with the phase of the reference signal obtained from the reference signal generator 30.

A phase error voltage obtained from the phase comparator 46 is supplied to a mixing amplifier 55, through the switch 54 which is connected to the contact N. The phase error voltage thus amplified at the mixing amplifier 55, is applied to the drum motor 36. Accordingly, the rotational phase of the drum motor 36 is controlled constant.

Figure 2:
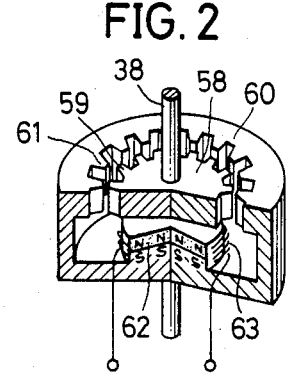
FIG. 2 is a perspective view, with a part cut away, showing the construction of a frequency generator in the block system shown in FIG. 1.

On the other hand, the rotational speed of the drum motor 36 is converted into a frequency by a frequency generator 37. The frequency generator 37 has a construction shown in FIG. 2, for example. In FIG. 2, a rotor 58 rotates unitarily with the rotary shaft 38 of the drum motor 36. Teeth 59 are formed on the outer peripheral surface of the rotor 58 at equally spaced intervals. Teeth 61 are formed on the inner peripheral surface of a stator 60 accommodating the rotor 58, on the surface separated from and opposing the outer peripheral surface of the rotor 58. The teeth 61 are formed with equally spaced intervals, and the number of these teeth 61 corresponds to the number of the teeth 59. A permanent magnet 62 is provided between the stator 60 and the rotor 58. Hence, as the teeth 59 of the rotating rotor 58 alternately oppose the crests and valleys of the teeth 61 of the stator 60, an AC voltage is obtained at a stator winding 63. That is, if the number of the teeth 59 of the rotor 58 is designated by P, P pulses are obtained at the output of the frequency generator 37 for each revolution of the rotor 58. The repetition frequency of the P pulses is in accordance with the rotational speed of the drum motor 36, and becomes 30P Hz upon reproduction of a video signal having a field frequency of 60 Hz. Upon reproduction of a video signal having a field frequency of 50 Hz, the above repetition frequency becomes 25P Hz.

The rotation detection pulse having the repetition frequency 30P or 25P which is obtained from the frequency generator 37, is supplied to a frequency-voltage converter 53 through an amplifier 47 and the switch 48. A rotation detection signal obtained from the frequency-voltage converter 53, having a level in accordance with the rotational speed of the drum motor 36, is applied to the drum motor 36 through the mixing amplifier 55. A closed loop formed by the above drum motor 36, frequency generator 37, amplifier 47, switch 48, frequency-voltage converter 53, and mixing amplifier 55, constitute a speed control circuit for the head servo circuit. This speed control circuit controls the drum motor 36 to rotate at a constant rotational speed. Thus, the rotational speed and the rotational phase of the drum motor 36 are controlled constant, and the video heads 15a and 15b accurately scan over the oblique tracks on the magnetic tape 11.

Accordingly, the recorded video signal on the magnetic tape 11, is alternately reproduced by the video heads 15a and 15b. The reproduced video signal is then supplied to a reproducing circuit 49 wherein a predetermined signal processing is performed, to restore the reproduced video signal into the original video signal. This original video signal thus obtained from the reproducing circuit 49 is produced through an output terminal 50.

Next, description will be given with respect to the operation of the apparatus upon high-speed reproduction. By pushing a high-speed reproduction manipulation button (not shown), the switches 23, 33, 48, and 54 are respectively connected to the contacts S, and the switch 28 is connected to the contact P. In addition, the pinch roller 17 is separated from the capstan 16 by a mechanism which is not shown in the drawing. Moreover, the rotation of an idler 35 provided on a rotary shaft of the reel motor 34, is simultaneously transmitted to either a supply reel base or a take-up reel base through a rotation transmitting mechanism (not shown). This rotation transmitting mechanism is changed over mechanically so that the rotation of the idler 35 is transmitted to the take-up reel base during the high-speed reproduction in which the magnetic tape 11 is caused to travel in the same direction as upon recording, and transmitted to the supply reel base during the high-speed reproduction in which the magnetic tape 11 is caused to travel in a direction opposite to that upon recording. Because the construction of the above mechanism for moving the pinch roller 17 away from the capstan 16 and the rotation transmitting mechanism are known, description of these mechanisms will be omitted.

In an initial state, the reel motor 34 is stopped and not rotating. Accordingly, the supply reel and the take-up reel do not rotate, and the magnetic tape 11 is stationary. Thus, the control head 26 cannot reproduce the control pulse, and the signal frequency supplied to the frequency-voltage converter 24 through the amplifier 27 and the switch 23 is zero. Therefore, the frequency-voltage converter 24 produces a signal of a maximum level. This signal from the frequency-voltage converter 24 is amplified to a predetermined level at the amplifier 32, and then applied to the reel motor 34 through the switch 33. The reel motor 34 is thus started, and the supply reel base or the take-up reel base starts to rotate. As the supply or take-up reel base rotates, the magnetic tape 11 is caused to travel in the direction of the arrow X or in a direction opposite thereto.

At this stage, the control pulse recorded on the control track is reproduced by the control head 26. The reproduced control pulse is supplied to the frequency-voltage converter 24, through the amplifier 27 and the switch 23. A voltage obtained from the frequency-voltage converter 24, having a level in accordance with the repetition frequency of the reproduced control pulse, is applied to the reel motor 34 through the amplifier 32 and the switch 33. The gain of the amplifier 32 is selected to a value so that the reel motor 34 rotates at a rotational speed sufficient to cause the magnetic tape 11 to travel at a speed in the order of ten times the tape speed upon normal reproduction and recording. Upon high-speed reproduction, the frequency-voltage converter 24 produces a voltage having a level in accordance with the repetition frequency of the reproduced control pulse. Accordingly, if the repetition frequency of the reproduced control pulse is lower than a predetermined value, the driving voltage is increased to rotate the reel motor 34 at a higher speed. On the other hand, if the repetition frequency of the reproduced control pulse is higher than a predetermined value, the driving voltage is reduced to rotate the reel motor 34 at a lower speed.

As a result, the reel motor 34 is controlled so that the repetition frequency of the reproduced control pulse always assumes the above predetermined value. Hence, the magnetic tape 11 is caused to travel at a constant speed regardless of the length (or amount) of tape wound around the reel. If the repetition frequency of the control pulse upon recording is 30 Hz, the above predetermined value becomes equal to 300 Hz upon high-speed reproduction in which the magnetic tape 11 is caused to travel at ten times the tape speed upon normal reproduction.

On the other hand, when the switch 54 is switched and becomes connected to the contact S, the phase control loop for the head servo circuit becomes disconnected. In addition, the switch 48 is simultaneously switched and connected to the contact S, and the input signal to the frequency-voltage converter 53 becomes switched. By the switching of the switch 54, a reference voltage from a reference voltage source 56 is applied to the drum motor 36 as a phase control signal, through the switch 54 and the mixing amplifier 55. The reference voltage obtained from this reference voltage source 56 is selected to a value such that the rotation of the drum motor 36 is controlled such and the horizontal scanning frequency is reproduced as a predetermined value.

A horizontal synchronizing signal within the video signal reproduced by the reproducing circuit 49, is separated at a horizontal synchronizing signal separating circuit 51. The separated horizontal synchronizing signal is supplied to a 1/N frequency divider 52 wherein the frequency is frequency-divided into 1/N the original frequency. An output of this 1/N frequency divider 52 is applied to the frequency-voltage converter 53, through the switch 48. Here, if measures are taken so that the input signal frequency of the frequency-voltage converter 53 is the same frequency upon high-speed reproduction, normal reproduction, and recording, it becomes unnecessary to adjust the frequency-voltage converter 53 upon high-speed reproduction so that the reproduced horizontal scanning frequency assumes the predetermined value. Furthermore, even if the reproducing apparatus is an apparatus for reproducing the NTSC system video signal or the CCIR system video signal, a frequency generator of the same construction may be used for the frequency generator 37. This is a desirable feature from the manufacturing point of view.

Accordingly, in the present embodiment of the invention, the number of the teeth P in the frequency generator 37 is commonly selected for the apparatuses which reproduces a video signal of either one of the systems. Moreover, the frequency-dividing ratio of the 1/N frequency divider 52 is switched and according to the reproduced horizontal scanning frequency, so that the input signal frequency to the frequency-voltage converter 53 becomes the same frequency upon high-speed reproduction, recording, and normal reproduction. That is, if the frequency-dividing ratio of the 1/N frequency divider 52 is designated by N1, the output signal frequency of the 1/N frequency divider 52 becomes $15,750/N1 = 21 \times 25 \times 30/N1$ Hz upon high-speed reproduction of a magnetic tape recorded with the NTSC system video signal. On the other hand, if the frequency-dividing ratio of the 1/N frequency divider 52 is designated by N2, the output signal frequency of the 1/N frequency divider 52 becomes $15,625/N2 = 25 \times 25 \times 25/N2$ Hz upon high-speed reproduction of a magnetic tape recorded with the CCIR system video signal having a horizontal scanning frequency of 15.625 kHz. Here, because the output signal frequency of the 1/N frequency divider 52 is the same frequency as upon recording and normal reproduction, the following equations (1) and (2) stand.

$$\frac{21 \times 25 \times 30}{N1} = 30P \qquad (1)$$

$$\frac{25 \times 25 \times 25}{N2} = 25P \qquad (2)$$

Accordingly, from the above equations (1) and (2), a frequency generator in which the number of teeth P is selected to the least common multiple "25" or its integral multiple can be used in common as the frequency generator 37, in the apparatus for reproducing the magnetic tape recorded with the NTSC system or the CCIR system video signal.

If the frequency generator 37 having the above construction is used, and the frequency-dividing ratio of the 1/N frequency divider 52 is selected to "21" upon high-speed reproducion of the magnetic tape recorded with the NTSC system video signal or selected to "25" upon high-speed reproduction of the magnetic tape recorded with the CCIR system video signal, the input signal frequency to the frequency-voltage converter 53 can be set to the same frequency upon high-speed reproduction, normal reproduction, and recording, even if the frequency of the reproduced horizontal synchronizing signal differ.

Actually, the horizontal scanning frequency of the NTSC system video signal is 15.734 kHz, and not 15.75 kHz. However, no problems are introduced because the difference between 15.734 kHz and 15.75 kHz is only in the range of 0.1%.

The output signal of the 1/N frequency divider 52 is thus supplied to the frequency-voltage converter 53, and the output of the frequency-voltage converter 53 is applied to the drum motor 36 as the speed control signal, through the mixing amplifier 55. Accordingly, the rotational speed of the drum motor 36 is controlled so that the horizontal scanning frequency is reproduced as the predetermined value.

Figure 3:
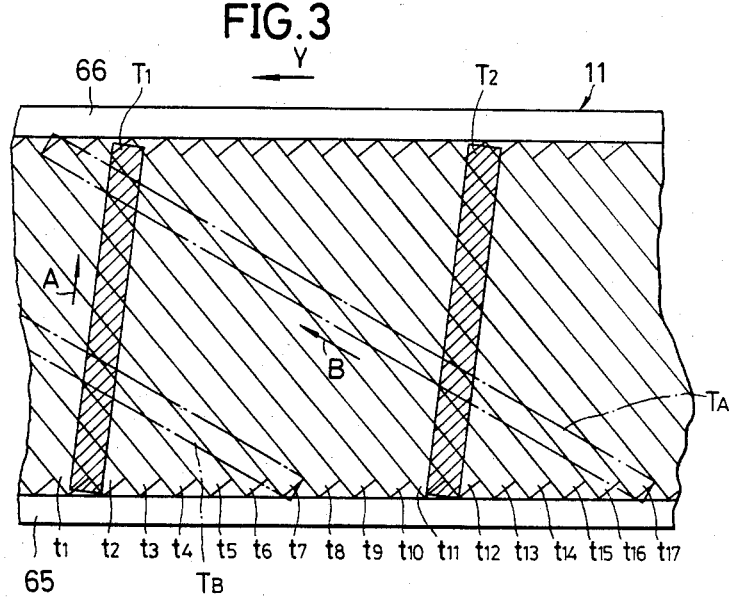
FIG. 3 shows examples of track scanning locus in the apparatus according to the present invention.

As described above, during high-speed reproduction, the magnetic tape 11 travels at a high speed in the order of ten times the tape speed upon normal reproduction, while the rotary drum 13 is rotated at a speed not much different from the rotational speed upon normal reproduction so that the horizontal scanning frequency is reproduced as the predetermined value. Hence, the scanning loci of the video heads 15a and 15b on the magnetic tape 11 become as shown in FIG. 3, wherein one video head scans across over approximately ten tracks. In FIG. 3, a control track 65 is formed along the longitudinal direction of the magnetic tape 11, below video signal recording tracks t1 through t17. In addition, an audio track 66 is formed along the longitudinal direction of the magnetic tape 11 above the tracks t1 through t17. During a forward high-speed reproduction in which the magnetic tape 11 is caused to travel in the same direction as upon normal reproduction, that is, in the direction of an arrow Y in FIG. 3, the video head 15a (or 15b) scans along a scanning locus T1. Then, the video head 15b (or 15a) scans along a scanning locus T2. An arrow A indicates the scanning direction of the head. On the other hand, during a reverse high-speed reproduction in which the magnetic tape 11 is caused to travel in the direction opposite to the tape traveling direction upon normal reproduction (that is, in the direction opposite to the direction of the arrow Y), the video head 15a (or 15b) scans along a scanning locus TA. The scanning by the video head 15a (or 15b) is followed by the scanning of the head 15b (or 15a) which scans along a scanning locus TB. An arrow B indicates the scanning direction of the head during this reverse high-speed reproduction.

Figure 4:
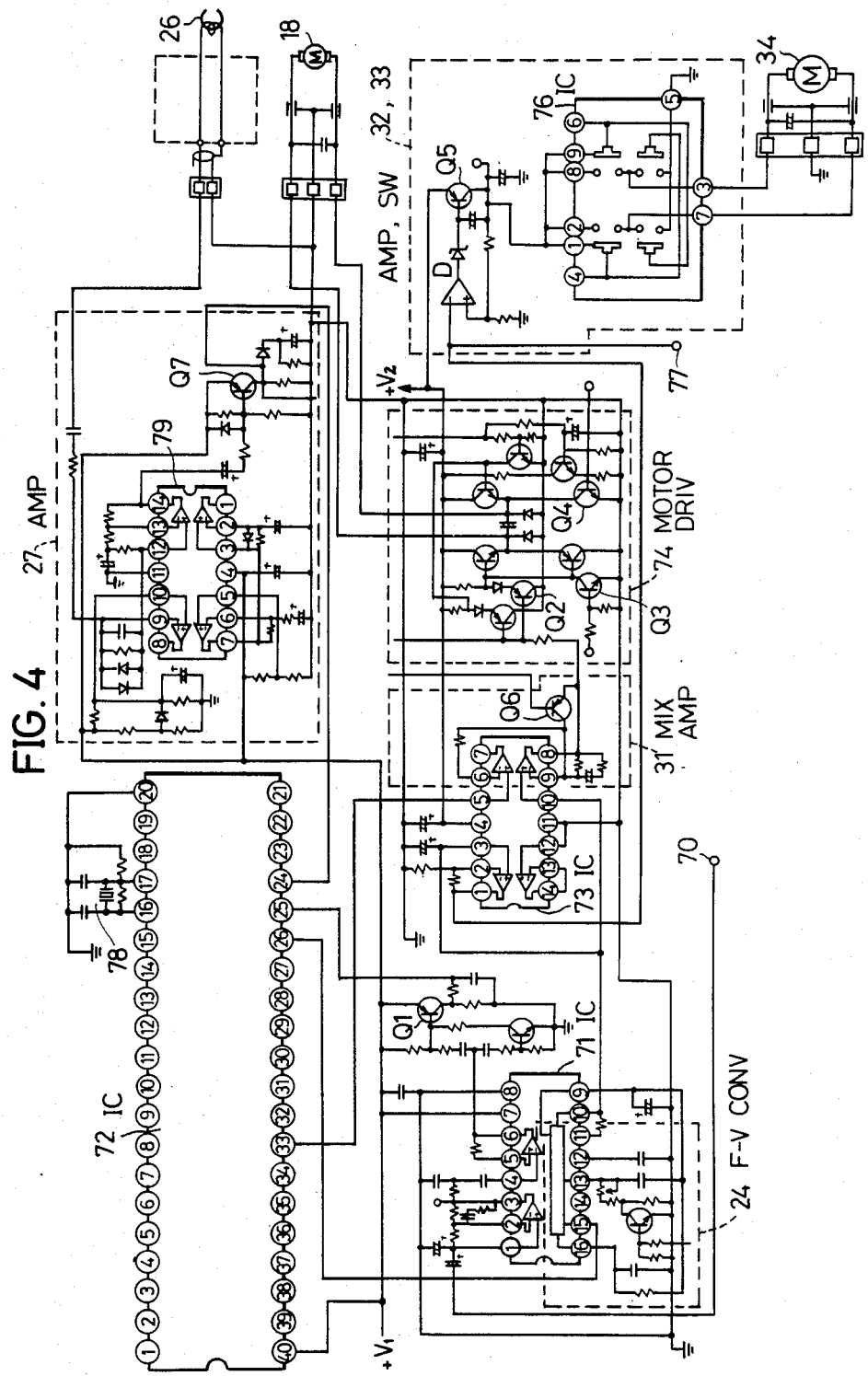
FIG. 4 is a concrete circuit diagram showing an embodiment of an essential part of the block system shown in FIG. 1.

Next, description will be given with respect to a concrete circuit for the capstan servo circuit part in the block system shown in FIG. 1, by referring to FIG. 4. In FIG. 4, those parts which are the same as those corresponding parts in FIG. 1 are designated by the same reference numerals. The rotation detection signal detected by the pickup head 21, is applied to a no. 2 pin of an integrated circuit (IC) 71, through an input terminal 70. This rotation detection signal is amplified and obtained from a no. 6 pin of the IC 71, and applied to a no. 25 pin of an IC 72 through the base and collector of a PNP type transistor Q1. The IC 72 comprises the switches 23 and 28, frequency divider 25, reference signal generator 30, and phase comparator 29 therein.

On the other hand, the reproduced control pulse from the control head 26, is applied to a no. 9 pin of an IC 79 which constructs the amplifier 27, and obtained from a no. 8 pin of the IC 79 through an amplifier within the IC 79. The signal from the no. 8 pin of the IC 79 is applied to a no. 12 pin of the IC 79. The reproduced control pulse from the no. 12 pin of the IC 79 is amplified and obtained from a no. 14 pin of the IC 79. This signal from the no. 14 pin of the IC 79 is then supplied to a no. 24 pin of the IC 72, through the base and collector of a PNP type transistor Q7.

The no. 24 pin and no. 25 pin of the IC 72 are input pins. During high-speed reproduction, the switch 27 within the IC 72 is switched according to a high-speed reproduction mode signal applied to a no. 31 pin of the IC 72. Hence, the reproduced control pulse applied to the no. 24 pin of the IC 72 is selectively produced through a no. 26 pin of the IC 72 upon high-speed reproduction. The reproduced control pulse obtained from the no. 26 pin of the IC 72 is applied to the frequency-voltage converter 24 within the IC 71 through a no. 15 pin of the IC 71. A voltage obtained as a result of the frequency-voltage conversion within the IC 71, is obtained through a no. 10 pin of the IC 71. This voltage from the no. 10 pin of the IC 71 is amplified by the mixing amplifier 31 within an IC 73. Thereafter, a signal from a no. 8 pin of the IC 73 is applied to the base of a PNP type transistor Q2 within a motor driving circuit 74.

The motor driving circuit 74 controls the rotational direction of the capstan motor 18, and is a circuit for also obtaining a predetermined motor driving current. When a high-level signal is applied to the base of an NPN type transistor Q3 and a low-level signal is applied to the base of an NPN type transistor Q4, the above motor driving circuit 74 produces a driving current for rotating the capstan motor 18 in the same direction as upon recording. On the other hand, if the input levels to the transistors Q3 and Q4 respectively are low level and high level, the motor driving circuit 74 produces a driving current to rotate the capstan motor 18 in the direction opposite to that upon recording. However, because the pinch roller 17 becomes separated from the capstan 16 upon high-speed reproduction as described above, the rotational state of the capstan motor 18 is unrelated to the operation upon high-speed reproduction. Hence, description will be omitted with respect to the circuit operation and rotational state of the capstan motor 18 during the high-speed reproduction.

On the other hand, a voltage in accordance with the repetition frequency of the reproduced control pulse obtained from the frequency-voltage converter 24 within the IC 71, is applied to a no. 3 pin of the IC 73. This voltage is amplified and obtained through a no. 1 pin of the IC 73. The amplified voltage from the no. 1 pin of the IC 73 is then applied to no. 2 and no. 8 pins of an IC 76 which constitutes the switch 33, through an operational amplifier 75 constituting the amplifier 32, a Zener diode D, and a PNP type transistor Q5. Signals obtained from no. 3 and no. 7 pins of the IC 76 are applied to the reel motor 34, to rotate the reel motor 34 at a high speed so that the repetition frequency of the reproduced control pulse becomes constant as described above. Upon normal reproduction, a predetermined voltage is applied to an inverting input terminal of the operational amplifier 75 from an input terminal 77.

A crystal oscillator circuit within the IC 72, which comprises a crystal vibrator 78 connected between no. 16 and no. 17 pins of the IC 72, oscillates at a frequency of 32.768 kHz. This frequency is frequency-divided into 1/1093 the original frequency, into a reference signal having the frequency of 30 Hz. A phase comparator within the IC 72 compares the phase of the above reference signal and the phase of the signal applied to a no. 25 pin of the IC 72. A phase comparison signal is thus obtained from a no. 33 pin of the IC 72, is supplied to a no. 5 pin of the IC 73, and amplified by the mixing amplifier 31 within the IC 73. The amplified signal is obtained from a no. 7 pin of the IC 73, and applied to the base of the transistor Q2 through a PNP type transistor Q6 for switching.

Figure 5:
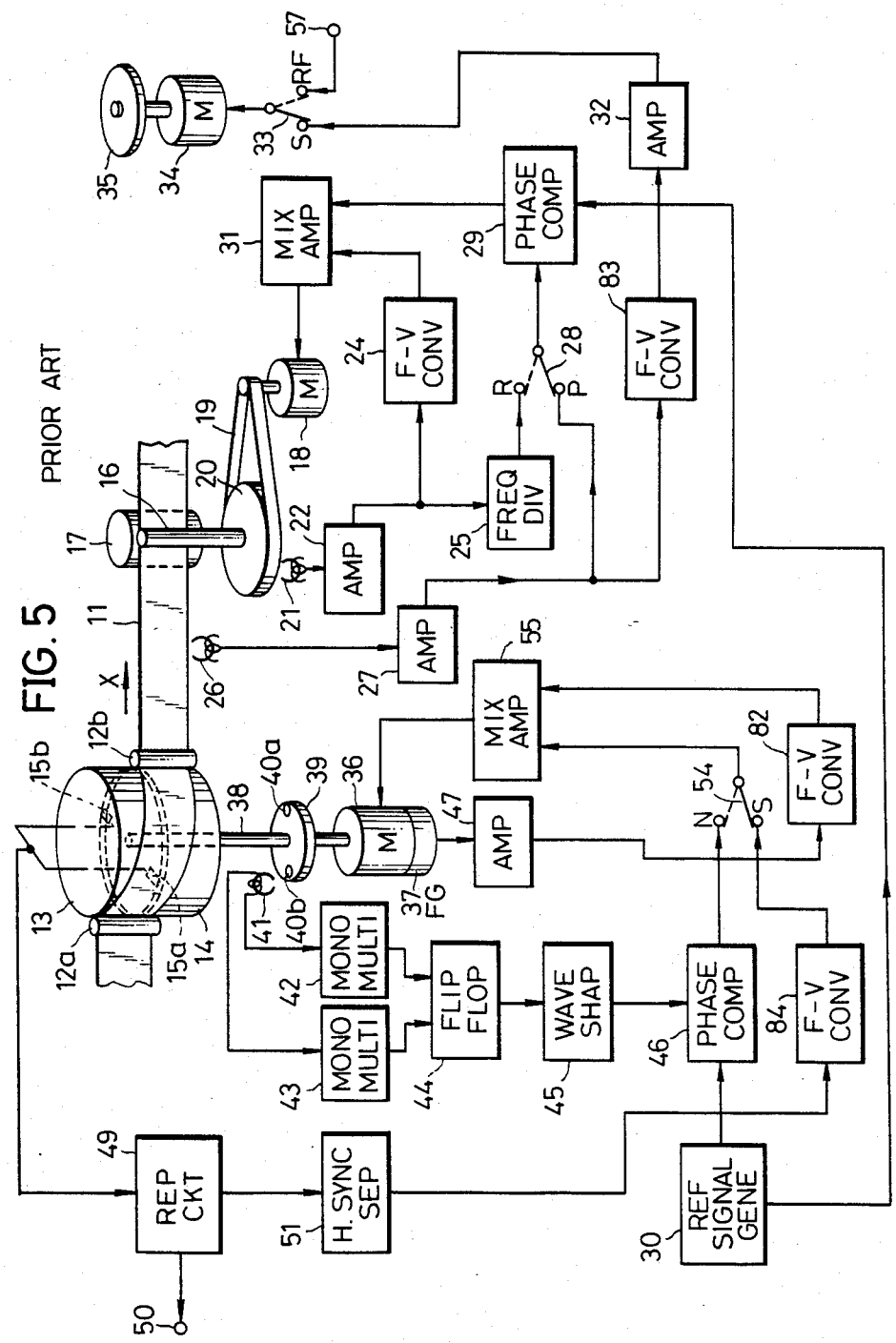
FIG. 5 is a systematic block diagram showing an example of a conventional reproducing apparatus capable of performing high-speed reproduction of a video signal.

In the reproducing apparatus according to the present invention, the frequency-voltage converters 24 and 53 used upon normal reproduction, are also used upon high-speed reproduction. Accordingly, the numer of frequency-voltage converters required is reduced compared to the conventional reproducing apparatus capable of performing high-speed reproduction such as that shown in FIG. 5. In FIG. 5, those parts which are the same as those corresponding parts in FIG. 1 are designated by the same reference numerals, and their description will be omitted. In the conventional apparatus shown in FIG. 5, the speed detection signal for the capstan servo circuit is obtained from a frequency-voltage converter 81 upon normal reproduction. This frequency-voltage converter 81 is supplied with the output signal of the amplifier 22. On the other hand, upon normal reproduction, the speed detection signal for the head servo circuit is obtained from a frequency-voltage converter 82 which is supplied with the output signal of the amplifier 47.

Upon high-speed reproduction, the reproduced control pulse is supplied to a frequency-voltage converter 83. An output voltage of this frequency-voltage converter 83 is applied to the reel motor 34, through the amplifier 32 and the switch 33. In addition, during high-speed reproduction, the reproduced horizontal synchronizing signal is supplied to a frequency-voltage converter 84. The reproduced horizontal synchronizing signal thus subjected to the frequency-voltage conversion at the frequency-voltage converter 84, is applied to the drum motor 36 through the switch 54 and the mixing amplifier 55. Accordingly, the rotational speed of the drum motor 36 is controlled so that the reproduced horizontal synchronizing frequency always assumes the predetermined value.

Therefore, in the conventional reproducing apparatus capable of performing high-speed reproduction, the frequency-voltage converters 81 and 82 used upon normal reproduction are not used upon high-speed reproduction. That is, upon high-speed reproduction, the frequency-voltage converters 83 and 84 provided exclusively for high-speed reproduction are used. However, in the reproducing apparatus according to the present invention, the frequency-voltage converters 24 and 53 shown in FIG. 1 are used upon normal reproduction and also upon high-speed reproduction. Accordingly, compared to the conventional reproducing apparatus, the number of frequency-voltage converters required is reduced to ½ according to the present invention. As a result, the circuit construction becomes simple, and the required adjustments are reduced.

There are two methods for performing high-speed reproduction. In one method, the magnetic tape is pinched between the capstan and the pinch roller, the capstan motor is controlled so as to rotate at a constant speed, and the tape is caused to travel by the capstan. In another method, the pinch roller is moved away from the capstan and the rotation of the reel motor is controlled so that the period of the reproduced control pulse becomes constant, to cause the tape to travel due to the rotational force of the reel. The present invention can be applied to an apparatus employing either one of these methods.

The frequency generator 37 is substantially the same as a rotation detection mechanism comprising a pickup head and the like. A combination of a gear wheel made of magnet and having the shape of a disc wherein teeth are periodically formed on the outer peripheral side thereof, and a magnetic detector, may be used instead of the above frequency generator 37. In addition, various rotation detection pulse generating means, such as means in which a plurality of holes are provided at predetermined radial positions on a disc which rotates unitarily with the drum motor 36 and a detector detects the light passing through the holes in the disc, may be used as the frequency generator 37.

Further, the present invention is not limited to these embodiments, but various variations and modifications may be made without departing from the scope of the present invention.

What is claimed is:

1. A video signal reproducing apparatus capable of performing high-speed reproduction, said video signal reproducing apparatus comprising:

reproducing means (13, 15a, 15b, 49) comprising at least one rotary video head (15a, 15b) for scanning over a tape (11) recorded with a video signal on tracks formed obliquely with respect to the longitudinal direction of said tape and control pulses recorded on a track formed along the longitudinal direction of said tape, said reproducing means reproducing the video signal from said oblique tracks;

tape driving means (34, 35, 16-20) for causing tape travel at a speed higher than a tape speed upon a normal reproduction during a high-speed reproduction;

a drum motor (36) for rotating said rotary video head;

drum motor speed detecting means (37) for producing a first rotation detection signal which has a frequency dependent on the rotational speed of said drum motor; and servo circuit means (48, 51-56) for controlling the rotation of said drum motor so that a reproduced horizontal synchronizing signal within the video signal reproduced by said reproducing means has a constant period which is substantially identical to the period of a horizontal synchronizing signal within the recorded video signal, said servo circuit means comprising a single first frequency-voltage converter (53) for subjecting an input signal to a frequency-voltage conversion and for supplying an output voltage to said drum motor, a reference voltage source (56) for generating a reference voltage having a predetermined constant value, first switching means (52, 48) for selectively supplying the output first rotation detection signal of said drum motor speed detecting means to said first frequency-voltage converter during the normal reproduction and for selectively supplying a periodic signal within the video signal reproduced by said reproducing means to said first frequency-voltage converter during the high-speed reproduction, and second switching means (54) for selectively supplying the output reference voltage of said reference voltage source to said drum motor.

2. A video signal reproducing apparatus as claimed in claim 1 in which said servo circuit means further comprises a horizontal synchronizing signal separating circuit (51) for separating the reproduced horizontal synchronizing signal from the video signal reproduced by said reproducing means, said horizontal synchronizing signal separating circuit supplying the separated reproduced horizontal synchronzing signal to said first switching means as said periodic signal.

3. A video signal reproducing apparatus as claimed in claim 2 in which said first switching means comprises a frequency divider (52) for frequency-dividing the frequency of the output reproduced horizontal synchronizing signal of said horizontal synchronizing signal separating circuit into a frequency which is identical to a repetition frequency of the rotation detection signal supplied to said first frequency-voltage converter during the normal reproduction.

4. A video signal reproducing apparatus as claimed in claim 1 in which said drum motor speed detecting means produces a number of pulses corresponding to an integral multiple of 25 for every revolution of said drum motor.

5. A video signal reproducing apparatus as claimed in claim 1 in which said tape driving means comprises a capstan motor (18) and a reel motor (34), and said reproducing apparatus further comprises a control head (26) for reproducing the control pulses from said tape, capstan motor speed detecting means (21) for reproducing a second rotation detection signal which has a frequency dependent on the rotational speed of said capstan motor, a single second frequency-voltage converter (24) for subjecting an input signal to a frequency-voltage conversion and for supplying an output voltage to said capstan motor and to said reel motor so as to control the rotations of said capstan and reel motors, and third switching means (23) for selectively supplying the output second rotation detection signal of said capstan motor speed detecting means to said second frequency-voltage converter during the normal reproduction and for selectively supplying the output reproduced control pulses of said control head to said second frequency-voltage converter during the high-speed reproduction.

* * * * *